United States Patent [19]

Shiga et al.

[11] Patent Number: 5,064,879

[45] Date of Patent: Nov. 12, 1991

[54] METHOD FOR SORBING METALLIC IONS USING ETHYLENE-N,N-DIALKYL AMINOALKYL ACRYLATES POLYMERS

[75] Inventors: Shujiro Shiga; Koji Kabasawa; Tadayuki Ohmae; Hisao Tanaka, all of Chiba, Japan

[73] Assignee: Sumitomo Chemical Co., Ltd., Osaka, Japan

[21] Appl. No.: 604,047

[22] Filed: Oct. 25, 1990

Related U.S. Application Data

[62] Division of Ser. No. 344,643, Apr. 28, 1989, abandoned.

[30] Foreign Application Priority Data

Apr. 28, 1988 [JP] Japan ................................. 63-107251

[51] Int. Cl.$^5$ ................................................. C08K 9/12
[52] U.S. Cl. ............................................. 523/310; 521/38
[58] Field of Search ............................ 523/310; 521/38

[56] References Cited

U.S. PATENT DOCUMENTS

| | | | |
|---|---|---|---|
| 3,308,081 | 3/1967 | Glabisch | 526/260 |
| 3,395,198 | 7/1968 | Taniguchi | 526/312 |
| 3,547,686 | 12/1970 | D'Alelio | 525/293 |

FOREIGN PATENT DOCUMENTS

| | | |
|---|---|---|
| 0188963 | 7/1986 | European Pat. Off. . |
| 0275763 | 7/1988 | European Pat. Off. . |
| 2124941 | 9/1972 | France . |
| 2208920 | 6/1974 | France . |
| 4222523 | 11/1967 | Japan . |
| 47-16542 | 9/1972 | Japan . |
| 49-45307 | 12/1974 | Japan . |
| 63-304010 | 12/1988 | Japan . |

*Primary Examiner*—Christopher Henderson
*Attorney, Agent, or Firm*—Sughrue, Mion, Zinn, Macpeak & Seas

[57] ABSTRACT

A metallic ion sorber capable of absoring ions of a metal excluding iron and cobalt and a method of sorbing ions of a metal excluding iron and cobalt are disclosed. The sorber comprises an ethylene copolymer containing from 40 to 95% by weight of ethylene and from 5 to 60% by weight of at least one of aminoalkyl acrylate compounds represented by formula:

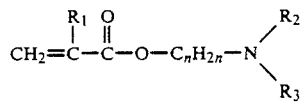

wherein $R_1$ represents a hydrogen atom or a methyl group;

$R_2$ and $R_3$ each represents an alkyl group having from 1 to 4 carbon atoms; and n represents an integer of from 1 to 4, and having a number average molecular weight of from 5,000 to 50,000.

4 Claims, No Drawings

METHOD FOR SORBING METALLIC IONS USING ETHYLENE-N,N-DIALKYL AMINOALKYL ACRYLATES POLYMERS

This is a divisional of application Ser. No. 07/344,643 filed Apr. 28, 1989, now abandoned.

FIELD OF THE INVENTION

This invention relates to a sorber comprising a functional resin having functions to separate or recover metallic ions and a method for sorbing metallic ions using the same. More particularly, it relates to a metallic ion sorber comprising a copolymer of ethylene and an aminoalkyl acrylate comonomer which can be used for separation and recovery of a metal from a metal salt aqueous solution and a method of using the same.

BACKGROUND OF THE INVENTION

Resins having a nitrile group or various chelate resins obtained by introducing an aminocarboxylic acid radical, an iminodiacetic acid radical, an amidoxime group or a primary, secondary or tertiary amine into styrene-divinylbenzene copolymer resins have conventionally been recommended for use in recovery of valuable metals or removal of metallic ions from waste water. However, since these resins are usually bead polymers or gels, it is difficult to process them to, for example, filters or sorbers of desired shape having small filtration resistance.

Other known techniques for recovery of valuable metals or removal of metallic ions from waste water include separation and concentration, such as precipitation and solvent extraction. These techniques however find difficulty in separation of metals at low concentrations.

More specifically, use of the chelate resins and the precipitation method have been tried on recovery of valuable metals, such as the group IIIA metals (according to the periodic table of IUPAC nomenclature, hereinafter the same), e.g., yttrium, cerium, and gadolinium, the group IVA metals, e.g., zirconium and hafnium, the group VA metals, e.g., niobium and tantalum, the group VIA metals, e.g., molybdenum, the group VIIA metals, e.g., technetium, the group VIII metals, e.g., rhodium, palladium, and platinum, and the group IB metals, e.g., silver and gold, and the group IIIB metals, e.g., gallium. Similarly, these techniques have been tried on removal of metals in waste water, including chromium, manganese, iron, cobalt, copper, zinc, tin, lead, etc. as well as the above-enumerated metals.

Recovery or removal of chromium, palladnium or uranium will be explained in more detail.

A large volume of waste water containing chromium is discharged from electroplating factories and factories of other metal surface treatments, such as surface polishing, anodic oxidation, and chemical film formation. The waste water from these factories may be conveniently divided into (i) a chromic acid type waste water containing chromium in relatively low concentrations but discharged in a large quantity and (ii) a thick chromic acid type waste water which is finally discharged in an inconsiderable quantity but contains a concentrated liquid of plate peel combined with the waste liquid. The composition of the waste water largely varies among factories in nature of the industry characterized by producing a variety of products in small quantities as described in *Kagaku Binran (Oyo hen)*, pp. 1166–1167, Maruzen (1980).

In the removal of chromium from the waste water stated above, hexavalent chromium present therein which is in the form of chromate ion ($CrO_4^{2-}$), is usually separated by precipitation. To this effect, hexavalent chromium is once reduced to trivalent ions by adjusting the waste water to a pH of 3 or less and then reacting chiefly with an inorganic reducing agent, such as sulfites and acidic sulfites. The reduction solution is then neutralized and rendered alkaline to precipitate chromium (iii) hydroxide, and agglomerates precipitated are separated and dehydrated to recover sludge. On the other hand, the residue clear solution is passed through a filter, adjusted to a proper pH, and discharged. Reference can be made in the above-cited literature (*Kagaku Binran*).

Waste water from chromite mines or refineries are essentially handled in the same manner as described above.

Separation of hexavalent chromium from the waste water discharged from cooling water lines in the petrochemical industry and the like is, in some cases, effected by the use of ion exchange resins or chelate resins. The same methods are also widely applied to the waste waters from test stations or research laboratories.

Separation of palladium is explained below. The waste water from nuclear fuel reprocessing, as a typical example of palladium-containing waste liquids, contains a variety of fission products. Predominantly implicit in the constituting elements are process-inerts, e.g., sodium and phosphorus; corrosion products, e.g., iron; fission products, e.g., cesium, barium, lanthanide series, zirconium, molybdenum, manganese, ruthenium, and palladium; and actinide series. Easygoing disposal of this particular waste water being not allowed because of its long-lasting high radioactivity, a method has been developed and being put into practice, in which the waste water is vitrified and placed in stainless steel containers, and the containers are semipermanently preserved remote from life under strict control.

From two points of view, many attempts have recently been made to separate the waste water from nuclear fuel reprocessing into groups of elements (group separation). One of the points is that separation of particularly long-life radioactive isotopes from the waste water would accelerate decay of radioactivity of the majority of the remainder so that the technologically unpredictable period of control reaching into astronomical figures can be reduced to a level of predictable realistic period of time. Another point of view is that palladium, ruthenium, rhodium, and the like in the waste would be effectively made use of as valuable metals and resources. Although palladium in the waste liquid includes radioactive isotopes having a very long half-life and is therefore limited in utility, it would be the most noteworthy element because of its relatively high abundance if economical recovery is established.

Considered from the results of studies on group separation, recovery of palladium would start first with separation of actinide series by extraction, ion exchanging, or precipitation. Extracting agents so far proposed for this separation include tributyl phosphate, dibutylethyl phosphonate, trioctylphosphine oxide (TOPO), dihexyl N,N-diethylcarbamylmethyl phosphonate, trioctylamine, di(2-ethylhexyl) phosphate, di(isodecyl) phosphate, and di(hexaoxyethyl) phosphate. These extracting agents are mostly used in combination with a hydrocarbon or a low-polar diluent, e.g., carbon tetrachloride. Quaternary ammonium type strongly basic ion exchange resins and strong cation exchange resins having a sulfo group have also been studied for this purpose as reported in Nakamura et al., *JAERI-M* 7852 (Sept., 1978). Famous method as a precipitation is an oxalate method.

Recovery of noble metals, e.g., palladium, can be planned either after separation of the actinide series or directly. Methods for recovering noble metals include a method comprising melting a vitrifier and a metal oxide in a reducing atmosphere as disclosed in G. A. Jensen et al., *Nucl. Technol.*, Vol. 65, p. 304 (1984) and Naito et al., *J. Nucl. Sci. Technol.*, Vol. 23, p. 540 (1986); a method of utilizing selective adsorption by quaternary ammonium slats as described in J. V. Panesco et al., *ARH* 733 (1968) or C. A. Colvin, *ARH* 1346 (1969); and a hydrogen sulfide precipitation method ad described in F. P. Roberts et al., *BNWL* 1693 (1972).

Each of the foregoing techniques is not yet industrially established as a method for handling the waste water from nuclear fuel reprocessing as stated. The waste liquid from nuclear fuel reprocessing is promising in that the noble metal contents reach higher figures than those in normal platinum metal ore by 2 to 3. Nevertheless, since it contains many metal species that should be separated, it is bad economy to separate noble metals through a number of processes. Above all things, the existence of radioactive isotopes strictly limits the market of the recovered noble metals, having prevented us from putting these methods into practice. However, the recent increase of industrial demands, anxiety on maldistribution of mining areas, and progress of the scheme of installing reprocessing factories on an industrial scale have gradually drawn attention of an industrial field to the recovery of these valuable metals.

Uranium adsorbers using functnal resins such as ion exchange resins and chelate resins have been practically applied for a long time to purification of uranium from an exudate of uranium ore. Seawater is expected as a future uranium source, and application of the uranium adsorbers to recovery of uranium from seawater, though not yet put into practical use, has been studied on an industrial scale in every country. Also in nuclear fuel reprocessing factories, use of adsorbers, though not yet industrialized, has called attention for a long time in replacement of wet processes attended by deterioration of a large quantity of a solvent as exemplified by the currently employed Purex process. Each of the above-described various steps corresponds to a main step of the process. In general, uranium is harmful to biological environment as a heavy metal and also as a radioactive substance. Uranium is therefore a heavy metal which requires separation from a dilute mixed solution in the waste water treatment everywhere in the atomic energy industry.

As the ion exchange resins having been practically applied to purification of uranium from an exudate of uranium ore, in order to chiefly adsorb and separate an anion complex salt, $UO_2(SO_4)_3{}^{4-}$ from a strongly sulfuric acid-acidic uranium solution, strongly basic ion exchange resins containing a tertiary amino group are used. Included under this type of ion exhange resin are commercially available Amberlite ® IRA-400 and its series and Dowex-I ® and its series of every grade. On the other hand, use of weakly basic ion exchange resins is also proposed. For example, it is reported that an ion exchange resin of a pyridine-divinylbenzene copolymer affords excellent results of uranium recovery from poor-grade uranium ore as described in JP-B-54-37016 and JP-B-61-1171 (the term "JP-B" as used herein means an "examined published Japanese patent application"), JP-A-54-103715 (the term "JP-A" as used herein means an "unexamined published Japanese patent application"), and Koei-Kagaku Kogyo K.K. (ed.), *Gijutsu Shiryo*, "Weakly Basic Ion Exchange Resin KEX".

Hydrous titanium hydroxide-based adsorbers and amidoxime type adsorbers are regarded promising as an adsorber for recovery of uranium in seawater as reported in Egawa, et al., *Journal of the Atomic Energy Society of Japan*, Vol. 29 (12), p. 1079 (1978). There are many other proposals on adsorbers of uranium.

Included in commercially available chelate resin adsorbers is Sumichelate ® CR 2, which exhibits excellent uranium adsorptivity.

These known techniques meet the industrial demands for adsorption capacity, selectivity over other ions, adsorption rate, resistance to swelling, desorptivity, resistance to oxidation, chemical resistance, resistance to deterioration, and the like to a certain extent. However, any of these functional resins serves for use only in a gel state of a three-dimensional crosslinked structure. Otherwise, the resin would be weakened due to swelling and finally degraded in an aqueous solution because of its high hydrophilic properties which are imparted for assuring an adsorption rate sufficient for practical use or which are characteristics of the adsorptive active group thereof. This gel resin has been greatly restricted on the mode of industrial utilization of the resin.

Hence, if one-dimentional thermoplastic resins can be endowed with the function of interest, it would be possible to obtain molded articles of any desired shape which, by themselves or after supplemental cross-linking, offer many advantages such as improved adsorption rate, broadened selection of pressure loss, and freedom of shape of apparatus, thus making a great contribution to uranium recovery.

SUMMARY OF THE INVENTION

One object of this invention is to provide a metallic ion sorber for separating recovering or removing metals from various aqueous solutions or waste liquids containing metallic ions, which can be applied to handling of liquids having low metal contents.

Another object of this invention is to provide a metallic ion sorber for separation, recovering or removing metals from various aqueous solutions or waste water, which is a molded article having a shape suited for increasing equipment efficiency, such as a filter, thereby having wide and varied application to recovery techniques which has never been accomplished by the conventional chelate resins.

A further object of this invention is to provide a method for sorbing metallic ions comprising using the above-described metallic ion sorber.

As a result of extensive investigations, the inventors have found that a copolymer of an aminoalkyl acrylate compound and ethylene having a specific copolymerization ratio can easily be molded into a desired shape meeting the end use to provide a novel metal sorber which exhibits high sorption of various kinds of metallic ions. The present invention has been completed based on this finding.

The present invention relates to a metallic ion sorber capable of sorbing ions of metals excluding iron and cobalt, which comprises an ethylene copolymer containing from 40 to 95% by weight of ethylene and from 5 to 60% by weight of at least one of aminoalkyl acrylate compounds represented by formula (I):

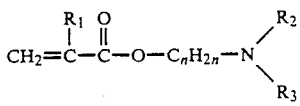

wherein
$R_1$ represents a hydrogen atom or a methyl group;
$R_2$ and $R_3$ each represents an alkyl group having from 1 to 4 carbon atoms; and
n represents an integer of from 1 to 4,
and having a number average molecular weight of from 5,000 to 50,000.

The present invention further relates to a method of sorbing ions of metals excluding iron and cobalt, which comprises using the above-described metallic ion sorber.

DETAILED DESCRIPTION OF THE INVENTION

The ethylene copolymer according to the present invention can generally be prepared by high-pressure radical polymerization as elucidated in JP-B-42-22523 and JP-B-49-45307. The preparation conditions therefor fall essentially within those of the currently widespread high-pressure polyethylene production process. From this point of view, the copolymer of the invention is good economy in its production process.

Specific examples of the aminoalkyl acrylate compound represented by formula (I) include acrylic esters, e.g., aminomethyl acrylate, aminoethyl acrylate, amino-n-butyl acrylate, N-methylaminoethyl acrylate, N-ethylaminoethyl acrylate, N-ethylaminoisobutyl acrylate, N-isopropylaminomethyl acrylate, N-isopropylaminoethyl acrylate, N-n-butylaminoethyl acrylate, N-t-butylaminoethyl acrylate, N,N-dimethylaminomethyl acrylate, N,N-dimethylaminoethyl acrylate, N,N-dimethylaminoisopropyl acrylate, N,N-dimethylamino-n-butyl acrylate, N-methyl-N-ethyl aminoethyl acrylate, N-methyl-N-n-butylaminoethyl acrylate, N,N-diethylaminoethyl acrylate, N,N-diisopropylaminoethyl acrylate, N,N-di-n-propylamino-n-propyl acrylate, N,N-di-n-butylaminoethyl acrylate, and N,N-di-n-butylamino-n-propyl acrylate; and methacrylic esters corresponding to these acrylic esters. Preferred of these comonomers are (di)alkylaminoethyl (meth)acrylates wherein n is 2 or 4. Specific examples of the preferred comonomers are dimethylaminoethyl acrylate, dimethylaminoethyl methacrylate, dimethylamino-n-butyl acrylate, dimethylamino-n-butyl methacrylate, di-n-butylaminoethyl acrylate, di-n-butylaminoethyl methacrylate, methylaminoethyl acrylate, methylaminoethyl methacrylate, aminoethyl acrylate, and aminoethyl methacrylate.

In formula (I), n is an integer of from 1 to 4; and the alkyl group as represented by $R_2$ or $R_3$ contains up to 4 carbon atoms. Compounds wherein n is 0 or more than 4 and/or $R_2$ and/or $R_3$ contain(s) more than 4 carbon atoms are expensive due to relative difficulty in industrial synthesis. Moreover, the so-called high-pressure ethylene polymerization process cannot be applied to these compounds due to unstability under heat and too high viscosity.

The polymerization ratio of the aminoalkyl acrylate compound in the ethylene copolymer ranges from 5 to 60% by weight, preferably from 15 to 55% by weight, more preferably from 20 to 50% by weight. If it is less than 5% by weight, the metallic ion sorption capacity is too low. If it exceeds 60% by weight, the resulting resin cannot be used as it is because it exhibits increased sorption of acids and is thereby swollen with an acidic solution, sometimes failing to retain its shape. The acid sorptivity of the resin is ascribable to basicity of the amino group, and swelling of the resin is considered to depend on the relationship between the aforesaid acid sorptivity and the strength of a three-dimensional structure formed by polyethylene crystallites made of ethylene chains in the molecules. The polyethylene crystallites decrease at an increasing rate according as the comonomer increases as assumed from FIG. 2 of JP-B-53-6194 showing the plot of melting point (Tm) vs. comonomer amount. It is likely that the crystallite is virtually zero with the comonomer amount exceeding 60% by weight. In some cases, therefore, crosslinking may be needed in order to control swelling of the resin below an industrially acceptable degree.

Even with a sufficient amount of the polyethylene crystallite, crosslinking may be carried out for the purpose of controlling the degree of swelling or enhancement of the strength. The resin to be used in the present invention is advantageous in that crosslinking can be effected by not only chemical crosslinking but physical crosslinking such as electron beam crosslinking and radiation crosslinking. This is because the physical crosslinking of polyethylene is generally of curing type. However, the field of crosslinking of ethylene copolymers containing more than 60% by weight of the comonomer has been unexplored. While the physical crosslinking method is the most suitable approach for effecting crosslinking of such high polymers without impairing the chemically active radicals, there still remains a room for further studies with respect to the behaviors of such high polymers.

In the production of the ethylene copolymer, for the purpose of facilitating continuous and stable feeding of the aminoalkyl acrylate compound to a high-pressure polymerization system by means of a pump and improving softness of the resulting copolymer, ethylene and the aminoalkyl acrylate comonomer may be combined with one or more of other ethylenically unsaturated comonomers copolymerizable with ethylene. In this case, the polymerization ratio of the other ethylenically unsaturated comonomer is up to 20% by weight, preferably up to 15% by weight. Such ethylenically unsaturated comonomers to be combined include methyl acrylate, ethyl acrylate, methyl methacrylate, and vinyl acetate.

The ethylene copolymer according to the present invention desirably has such a molecular weight that the intrinsic viscosity as determined in a tetralin solution at 135° C. falls within a range of from 0.1 to 4 dl/g. Such a viscosity range corresponds to a number average molecular weight of from 5,000 to 50,000, preferably from 8,000 to 40,000, or a melt index (JIS K-6760, 190° C.) of from 1 to 1,000 g/10 minutes, preferably from 50 to 500 g/10 minutes. The above-specified range of the intrinsic viscosity, number average molecular weight or melt index is a limitation necessary for industrially carring out molding of the resin.

The ethylene copolymer of the invention can be molded into arbitrary shapes, such as tubes, sheets, films, rods, fibers, non-woven fabric, woven fabric, and hollow yarns. The molded fibers, hollow yarns, etc. can be easily fabricated to filters, pipes, etc.

The ethylene copolymer, when molded into fibers, may be use alone or, if desired to improve fibrous strength and the like, may be blended with poly-α-olefin resins (e.g., polypropylene), polyamide resins or polyester resins to obtain fibers or yarns. Further, conjugate fibers comprising the ethylene copolymer and poly-α-olefin resins, polyamide resins, polyester resins, etc. in a parallel form or core-sheath form (the ethylene copolymer being the sheath) as well as nonwoven fabric, woven fabric, and filters made of these conjugate fibers are also employable in this invention.

The ethylene copolymer can also be combined with other high polymers or inorganic materials such as metallic materials, glass and wood to obtain composite materials. In such composite materials, the copolymer serves as a functional material, while the other material combined usually serves as a structural material. The fact that the copolymer of the invention comprises non-polar ethylene and a polar aminoalkyl acrylate compound and thus exhibits satisfactory affinity to other materials broadens the range of choise of materials which can be combined therewith. This is the point which makes the copolymer more useful.

It is believed that the metallic ion sorptivity of the ethylene copolymer is attributed to the chelating ability of the aminoalkyl acrylate comonomer. For example, when the resin is brought into contact with palladium chloride in a highly acidic aqueous solution, the resin turns to yellow inclining to brown more than the solution.

On the other hand, the amino group of the comonomer unit is easily quaternalized. For example, there is $-N^+H(CH_3)_2Cl^{31}$ in a hydrochloric acid-acidic aqueous solution. The fact that the sorptivity of the copolymer is strongly ruled by a pH condition similarly to ion exchange resins or chelate resins in phenomenon suggests that at least one of ligands of the copolymer which chelate a metallic ion is the nitrogen atom of the amino group.

Sorption and separation of metallic ions from an aqueous solution by the use of the copolymer of the invention can be achieved by adjusting the aqueous solution to the optimum hydrogen ion concentration according to the kind of metallic ion to be separated.

The metallic ions to which the present invention is preferably applicable are the metals of the groups IIIA, IVA, VA, VIA, VIIA, VIII, IB, IIB, IIIB, and IVB of the periodic table according to the IUPAC nomenclature.

The hydrogen ion concentration, i.e., pH, at which the sorber of the invention exhibits excellent sorptivity is 7 or less, preferably between 0 and 6, for sorption of chromium (group VIA); 2 or less, preferably 1.5 or less, for sorption of palladium (group VIII); 7 or less, preferably between 0 and 6, for sorption of uranium (group IIIA) in the form of uranyl sulfate; between 1 and 4 for sorption of vanadium (group VA); 5 or less, preferably between 1 and 5, for sorption of copper (group IB); or in a strongly acidic side for sorption of zirconium (group IVA), hafnium (group IVA) or zinc (group IIB).

The terminology "sorption of metallic ions" as used herein means not only adsorption of metallic ions into the copolymer resin but also precipitation of metal salts induced by pH change in the inside or on the surface of the resin, or incorporation or deposition of the metallic ions precipitated from the aqueous solution into the inside or on the surface of the resin.

In carrying out the sorption and separation of metals from an aqueous solution by using the ethylene copolymer, the aqueous solution to be treated is continuously passed through a fixed bed packed with the resin beads or pellets to a desired height or through a multi-stage filter comprising a desired number of filter media of various shapes, such as fibrous mats, non-woven or woven cloth, and cartridges. The size and shape of the filler or the net structure of the filler cloth, etc. can be appropriately selected to embody varied designs giving weight to, for example, pressure loss, effective absorption capacity, sorption rate, or exchange system of the filler. Possible embodiments further include continuous treatment in a mobile or fluidized bed system.

The pH of the metallic ion aqueous solution subject to treatment is adjusted to the optimum range according to the kind of the metal, for example, 7 or less, preferably from 0 to 6, for chromium; 2 or less, preferably 1.5 or less, for palladium; and 7 or less, preferably from 0 to 6, for uranium.

At the time when a break through point of the sorber is reached, the sorber is rapidly regenerated or exchanged. The spent sorber can be regenerated simply by washing with water adjusted to a pH outside the respective range suitable for sorption of the metallic ion with an alkali or a mineral acid to thereby elute the sorbate with relative ease. This ease in elution is also one of the advantages of the present invention.

In cases where the treatment aims only at separation of metallic ions from aqueous solutions without demanding recovery of the metallic ion or in cases where plural kinds of metallic ions are sorbed and, therefore, recovery is not economical, the spent sorber is incinerated for volume reduction and the ash is disposed through proper means.

In cases where recovery of the sorbed metal is desired, it is possible to once incinerate the sorber and then recover the metal from the ash. The ethylene copolymer does not contain sulfur so that no sulfur trioxide generates on incineration. As long as waste water to be treated does not contain a sulfuric acid radical or any other sulfur compound, corrosion of incinerators, the most serious accident incidental to incineration, can thus be avoided. Even if the waste water contains a sulfur compound, such can be displaced with relative ease by addition of a minor process, thereby making the most of the merit stated above. This is a still another superior aspect of the method according to the present invention.

The present invention is now illustrated in greater detail with reference to the following Examples and Comparative Examples, but it should be understood that the present invention is not deemed to be limited thereto. In these examples, all the percents and parts per million are by weight unless otherwise specified.

EXAMPLE 1

A copolymer comprising 57% of ethylene and 43% of N,N-dimethylaminoethyl methacrylate was prepared according to a high-pressure radical continuous copolymerization process. The copolymer had a number average molecular weight of $1.3 \times 10^4$ and a melt index (JIS K-6760, 190° C., hereinafter the same) of 230.

The copolymer was processed to cylindrical pellets of 2 mm in diameter and 3 mm in length by use of an extruder and a pelletizer.

Separately, an aqueous solution of a salt of Zr (group IVA), Hf (group IVA), Pd (group VIII), Zn (group IIB) or Cr (group VIA) was prepared and adjusted to have an acid concentration or a pH as shown in Tables 1 to 3 below at room temperature. The above obtained pellet weighing 0.5 g or 1 g was put in 50 ml of the metal salt aqueous solution as room temperature, and the solution was stirred with a stirrer for 12 hours for the case of Pd or 16 hours for other cases. The metallic ion concentrations (M ion concn.) in the aqueous solution before and after the testing were determined by means of a plasma emission spectrometer (IPC-AES SPS-700, manufactured by Seiko Instruments & Electronics Ltd.) to obtain metal sorption rate (%). The results obtained are shown in Tables 1, 2 and 3.

tion treatment and then tested for Pd sorptivity in the same manner as in Example 1. The hydrogen ion adsorption treatment used here was carried out by the same operation as above described, except for using an aqueous solution of an acid in a varied concentration but containing no Pd ion. Since the copolymer of the present invention sorbs hydrogen ion as well as metallic ions, this treatment was done for the purpose of previously saturating the copolymer with hydrogen ion.

The results obtained are shown in Table 4.

TABLE 1

| Run No. | Metal Salt | Weight of Copolymer (g) | Before Sorption | | | M Ion Concn. After Sorption (ppm) | Metal Sorption Rate (%) |
|---|---|---|---|---|---|---|---|
| | | | M Ion Concn. (ppm) | Acid Added | | | |
| | | | | Kind | Concn. (N) | | |
| 1-1 | ZrCl4 | 0.5 | 106 | H2SO4 | 0.1 | 41.9 | 60.5 |
| 1-2 | " | " | " | " | 0.3 | 49.2 | 53.6 |
| 1-3 | " | " | " | " | 0.5 | 56.8 | 46.4 |
| 1-4 | " | " | " | " | 0.8 | 67.8 | 36.0 |
| 1-5 | " | " | " | " | 1.0 | 74.5 | 29.7 |
| 1-6 | HfCl4 | " | 96 | " | 0.1 | 14.4 | 85.0 |
| 1-7 | " | " | " | " | 0.3 | 47.0 | 51.0 |
| 1-8 | " | " | " | " | 0.5 | 66.5 | 30.7 |
| 1-9 | " | " | " | " | 0.8 | 85.2 | 11.3 |
| 1-10 | " | " | " | " | 1.0 | 86.4 | 10.0 |
| 1-11 | ZnCl2 | " | 102 | HCl | 1.0 | 69.8 | 31.6 |
| 1-12 | " | " | " | " | 2.0 | 40.4 | 60.4 |
| 1-13 | " | " | " | " | 3.0 | 36.7 | 64.0 |
| 1-14 | " | " | " | " | 4.0 | 44.6 | 56.3 |

TABLE 2

| Run No. | Metal Salt | Weight of Copolymer (g) | Before Sorption | | After Sorption | | Cr Sorption Rate (%) |
|---|---|---|---|---|---|---|---|
| | | | Cr Ion Concn. (ppm) | pH-Adjustor | pH | Cr Ion Concn. (ppm) | |
| 1-15 | CrO3 | 1.0 | 105 | HCl and NaOH | 0 | 79.8 | 24.0 |
| 1-16 | " | " | " | " | 1.0 | 60.9 | 42.0 |
| 1-17 | " | " | " | " | 2.0 | 5.3 | 95.0 |
| 1-18 | " | " | " | " | 3.8 | 1.1 | 99.0 |
| 1-19 | " | " | " | " | 5.5 | 36.8 | 65.0 |
| 1-20 | " | " | " | " | 6.1 | 59.6 | 43.2 |
| 1-21 | " | " | " | " | 6.4 | 90.3 | 14.0 |
| 1-22 | " | " | " | " | 7.5 | 105 | 0 |
| 1-23 | " | " | " | " | 9.2 | 105 | 0 |

TABLE 3

| Run No. | Before Sorption | | After Sorption | | Pd Sorption Rate (%) |
|---|---|---|---|---|---|
| | pH | Pd Concn. (ppm) | pH | Pd Concn. (ppm) | |
| 1-24 | 0.737 | 105.3 | 0.927 | 0.4783 | 99.55 |
| 1-25 | 1.037 | " | 1.258 | 0.2351 | 99.68 |
| 1-26 | 1.527 | " | 1.685 | 0.5437 | 99.48 |
| 1-27 | 2.102 | " | 3.102 | 66.71 | 36.65 |

EXAMPLE 2

The same copolymer pellet as obtained in Example 1 weighing 0.2 g was subjected to hydrogen ion adsorp-

TABLE 4

| Run No. | Before Sorption | | After Sorption | | Pd Sorption Rate (%) |
|---|---|---|---|---|---|
| | pH | Pd Concn. (ppm) | pH | Pd Concn. (ppm) | |
| 2-1 | 1N—HCl | 109.8 | — | 39.03 | 64.45 |
| 2-2 | 0.5N—HCl | " | — | 23.60 | 78.51 |
| 2-3 | 1.014 | " | 1.042 | 2.89 | 97.37 |
| 2-4 | 1.479 | " | 1.455 | 0.635 | 99.42 |
| 2-5 | 2.127 | " | 2.097 | 0.409 | 99.63 |

EXAMPLE 3

Testing on Pd sorption was carried out in the same manner as in Example 2, except for fixing the pH of the aqueous solution around 1.6 and varying the weight of the copolymer pellet between 0.1 g and 1.0 g. The results of the test are shown in Table 5.

TABLE 5

| Run No. | Weight of Copolymer (g) | Before Sorption | | After Sorption | | Sorption molar Ratio* | Pd Sorption Rate (%) |
|---|---|---|---|---|---|---|---|
| | | pH | Pd Concn. (ppm) | pH | Pd Concn. (ppm) | | |
| 3-1 | 0.1 | 1.577 | 106.8 | 1.614 | 10.75 | 6.07 | 89.93 |
| 3-2 | 0.3 | " | " | 1.604 | 0.562 | 16.5 | 99.47 |
| 3-3 | 0.5 | " | " | 1.613 | 0.124 | 27.3 | 99.88 |

TABLE 5-continued

| Run No. | Weight of Copolymer (g) | Before Sorption pH | Before Sorption Pd Concn. (ppm) | After Sorption pH | After Sorption Pd Concn. (ppm) | Sorption molar Ratio* | Pd Sorption Rate (%) |
|---|---|---|---|---|---|---|---|
| 3-4 | 1.0 | " | " | 1.673 | 0.305 | 54.7 | 99.71 |

Note: *Number of moles of the comonomer per mol of Pd sorbed in the copolymer.

EXAMPLE 4

Sorption and desorption of Pd were repeated as follows.

First sorption was carried out in the same manner as in Example 3, except for fixing the weight of the copolymer pellet at 0.2 g. The whole amount of the pellet used was separated from the aqueous solution and, after draining off the liquid, immersed in 50 ml of a nitric acid aqueous solution having a varied normality for 12 hours while stirring with a stirrer.

Second and third sorption and desorption were performed in the same manner as for the first sorption and desorption to examine change of sorptive and desorptive ability of the copolymer pellet due to repeated use. The results obtained are shown in Table 6, and rearranged results are shown in Table 7. In Table 7, "desorption rate" is a percent of the desorbed amount of Pd based on the total amount of Pd absorbed in the copolymer.

TABLE 6

|  | Run No. 4-1 | Run No. 4-2 | Run No. 4-3 |
|---|---|---|---|
| 1st Sorption: | | | |
| pH Before Sorption | 1.612 | 1.612 | 1.612 |
| pH After Sorption | 1.595 | 1.595 | 1.595 |
| Pd Concn. Before Sorption (ppm) | 106.8 | 106.8 | 106.8 |
| Pd Concn. After Sorption (ppm) | 0.449 | 0.449 | 0.449 |
| 1st Desorption: | | | |
| Normality (N) | 1 | 3 | 10 |
| Pd Concn. Before Desorption (ppm) | 0 | 0 | 0 |
| Pd Concn. After Desorption (ppm) | 57.75 | 71.66 | 63.07 |
| 2nd Sorption: | | | |
| pH Before Sorption | 1.588 | 1.588 | 1.588 |
| pH After Sorption | 1.505 | 1.364 | 1.364 |
| Pd Concn. Before Desorption (ppm) | 104.1 | 104.1 | 104.1 |
| Pd Concn. After Desorption (ppm) | 3.411 | 2.451 | 9.255 |
| 2nd Desorption: | | | |
| Normality (N) | 1 | 3 | 10 |
| Pd Concn. Before Desorption (ppm) | 0 | 0 | 0 |
| Pd Concn. After Desorption (ppm) | 76.9 | 92.96 | 92.48 |
| 3rd Sorption: | | | |
| pH Before Sorption | 1.573 | 1.573 | 1.573 |
| pH After Sorption | 1.370 | 1.360 | 1.239 |
| Pd Concn. Before Sorption (ppm) | 101.1 | 101.1 | 101.1 |
| Pd Concn. After Sorption (ppm) | 1.915 | 1.963 | 5.19 |
| 3rd Desorption: | | | |
| Normality (N) | 1 | 3 | 10 |
| Pd Concn. Before Desorption (ppm) | 0 | 0 | 0 |
| Pd Concn. After Desorption (ppm) | 88.48 | 111.27 | 112.0 |

TABLE 7

|  | Run No. 4-1 | Run No. 4-2 | Run No. 4-3 |
|---|---|---|---|
| First Operation: | | | |
| Sorption Rate (%) | 99.6 | 99.6 | 99.6 |
| Desorption Rate (%) | 54.3 | 67.4 | 59.3 |
| Second Operation: | | | |
| Sorption Rate (%) | 96.7 | 97.6 | 91.1 |
| Desorption Rate (%) | 51.5 | 68.2 | 67.0 |
| Third Operation: | | | |
| Sorption Rate (%) | 98.0 | 98.1 | 94.9 |
| Desorption Rate (%) | 51.6 | 78.1 | 79.1 |

EXAMPLE 5

Selectivity of the ethylene copolymer of the invention in sorption of Pd from a mixed aqueous solution containing various metal compounds was evaluated following the procedure of Example 2. That is, the copolymer pellet having been subjected to hydrogen ion adsorption treatment in a nitric acid aqueous solution was put in a mixed solution containing $Pd(NO_3)_2$, $Rh(NO_3)_3$, $RuNO(NO_3)_2$, $MoCl_5$, $NaNO_3$, and nitric acid at a varied nitric acid normality to effect metallic ion sorption. The weight of the pellet was 1 g per 50 ml of the solution. The results obtained are shown in Table 8.

TABLE 8

| | Metallic Element | | | | | |
|---|---|---|---|---|---|---|
| | Pd | Rh | Ru | Mo | Na | Remarks |
| Concn. Before Sorption (ppm) | 27.9 | 11.4 | 50.0 | 92.4 | 383 | |
| 3N $HNO_3$: | | | | | | No precipitate was observed. The resin turned yellow. |
| Concn. After Sorption (ppm): | 22.2 | 10.4 | 44.2 | 88.7 | 370 | |
| Sorption Rate (%) | 20.4 | 8.8 | 11.6 | 4.0 | 3.1 | |
| 1N $HNO_3$: | | | | | | No precipitate was observed. The resin turned yellow. |
| Concn. After Sorption (ppm): | 18.4 | 10.7 | 44.5 | 87.0 | 371 | |
| Sorption Rate (%) | 34.1 | 6.1 | 1.1 | 5.8 | 2.9 | |
| 0.5N $HNO_3$: | | | | | | No precipitate was observed The resin turned yellowish brown. |
| Concn. After Sorption (ppm): | 13.2 | 10.9 | 45.7 | 88.5 | 386 | |
| Sorption Rate (%) | 52.7 | 4.4 | 8.6 | 4.2 | 0 | |
| 0.1N $HNO_3$: | | | | | | No precipitate was observed. The resin turned blackish brown. |
| Concn. After Sorption (ppm): | 4.36 | 10.8 | 47.3 | 93.0 | 383 | |
| Sorption Rate (%) | 84.3 | 5.3 | 5.4 | 0 | 0 | |

EXAMPLE 6

One gram of the same copolymer pellet as obtained in Example 1 was put in 50 ml of an aqueous solution containing uranyl nitrate at a uranium concentration of 100.0 ppm and sodium carbonate at a molar concentration of 4 times the uranium, the pH of the solution having been adjusted with a 1N nitric acid aqueous solution, and the mixture was stirred with a stirrer at room temperature for 16 hours. The uranium concentrations before and after the sorption were analyzed in the same manner as in Example 1 to calculate the uranium sorption rate (%) of the ethylene copolymer. The results obtained are shown in Table 9.

TABLE 9

| Run No. | U Concn. Before Sorption (ppm) | After Sorption U Concn. (ppm) | pH | U Sorption Rate (%) |
|---|---|---|---|---|
| 6-1 | 100.0 | 100 | 2.5 | 0 |
| 6-2 | " | 98 | 4.5 | 2.0 |
| 6-3 | " | 93 | 4.7 | 7.0 |
| 6-4 | " | 90 | 5.0 | 10.0 |
| 6-5 | " | 96 | 5.9 | 4.0 |
| 6-6 | " | 98 | 7.8 | 2.0 |
| 6-7 | " | 100 | 9.7 | 0 |

EXAMPLE 7

One gram of the same copolymer pellet as obtained in Example 1 was placed in 50 ml of a uranyl sulfate aqueous solution (uranium concentration: 102 ppm having been adjusted to a varied pH with 1N sulfuric acid and 1N sodium hydroxide, and the mixture was stirred with a stirrer at room temperature for 16 hours. The uranium concentrations before and after the sorption were analyzed to obtain a uranium sorption rate of the copolymer. The results obtained are shown in Table 10.

TABLE 10

| Run No. | U Concn. Before Sorption (ppm) | After Sorption U Concn. (ppm) | pH | U Sorption Rate (%) |
|---|---|---|---|---|
| 7-1 | 102 | 43.6 | 0 | 57.3 |
| 7-2 | " | 6.1 | 1.0 | 94.0 |
| 7-3 | " | 6.1 | 1.5 | 94.0 |
| 7-4 | " | 6.1 | 2.5 | 94.0 |
| 7-5 | " | 18.4 | 4.0 | 82.0 |
| 7-6 | " | 25.0 | 4.6 | 75.5 |
| 7-7 | " | 29.4 | 5.0 | 71.2 |
| 7-8 | " | 90.5 | 5.7 | 11.3 |
| 7-9 | " | 90.7 | 6.3 | 11.1 |
| 7-10 | " | 91.3 | 6.8 | 10.5 |

EXAMPLE 8

One gram of the same copolymer pellet as obtained in Example 1 was press-molded at 130° C. to obtain a press sheet having a thickness of about 1 mm. A 30 mm × 40 mm sheet was cut out of the press sheet for use as a metallic ion sorber.

The cut-to-size sheet was immersed in 100 ml of a titanium sulfate solution at 25° C. for a prescribed period of time to effect sorption. For comparison, the same test was repeated, except that pure water containing no titanium sulfate was used (Run Nos. C-1 to C-5). The results obtained are shown in Table II.

TABLE 11

| Run No. | Before Sorption Ti(SO$_4$)$_2$ Concn. (%) | pH | Immersion Time (hr) | After Sorption pH | Weight Gain of Sheet (%) | Ti Sorption Rate (%) |
|---|---|---|---|---|---|---|
| 8-1 | 1.3 | 0.9 | 0.5 | — | 53 | 9 |
| 8-2 | " | " | 1 | — | 73 | 13 |
| 8-3 | " | " | 3 | — | 87 | 17 |
| 8-4 | " | " | 6 | 1.0 | 87 | 17 |
| 8-5 | " | " | 72 | 1.0 | 90 | 18 |
| C-1 | 0 | 6.8 | 0.5 | — | 0.6 | — |
| C-2 | " | " | 1 | — | 0.7 | — |
| C-3 | " | " | 3 | — | 0.7 | — |
| C-4 | " | " | 6 | 4.6 | 0.7 | — |
| C-5 | " | " | 72 | 4.6 | 2.0 | — |

Formation of precipitates was not observed before and after the sorption.

EXAMPLE 9

The same sheet (30 mm × 40 mm) as prepared in Example 8 was placed in 100 ml of an aqueous solution containing a salt of V (group VA), Cr (group VIA), Mo (group VIA), Mn (group VIIA), Ni (group VIII) or Pd (group VIII), and sorption was effected at 60° C. for 3 hours. The results obtained are shown in Table 12.

EXAMPLE 10

The same sheet as prepared in Example 8 was placed in 100 ml of an aqueous solution containing a salt of Cu (group IB), Ag (group IB), Zn (group IIB) or Ga (group IIIB), and sorption was effected at 60° C. for 3 hours. The results obtained are shown in Table 13.

EXAMPLE 11

The same sheet was prepared in Example 8 was placed in 100 ml of an aqueous solution containing chloroplatinic acid or potassium bichromate, and sorption was effected at 60° C. for 3 hours. The results obtained are shown in Table 14.

TABLE 12

| Run No. | Before Sorption Metal Salt Kind | Concn. (wt %) | Acid Added | pH | Tone of Aqueous Solution | After Sorption pH | Tone of Aqueous Solution | Wt. Gain of Sheet (wt %) | Change of Tone of Sheet | Sorption Rate (wt %) |
|---|---|---|---|---|---|---|---|---|---|---|
| 9-1 | Vo(SO$_4$) | 0.88 | — | 2.8 | blue | 2.8 | bluish green | 152 | deep bluish green | 15 |
| 9-2 | " | " | H$_2$SO$_4$ | 1.0 | " | 1.2 | deep blue | 255 | pale blue | 8 |
| 9-3 | CrCl$_3$ | 0.85 | — | 3.1 | deep green | 3.2 | deep bluish green | 247 | deep green | 18 |
| 9-4 | " | " | HCl | 1.0 | " | 1.2 | " | 327 | light bluish green | 7 |
| 9-5 | MoCl$_5$ | 1.5 | — | 0.79 | blackish brown | 0.95 | blackish liver brown | 332 | blackish brown | 20 |
| 9-6 | MnCl$_2$ | 0.68 | — | 5.8 | colorless transparent | 5.2 | colorless transparent | 0 | no change | 0 |
| 9-7 | " | " | HCl | 1.0 | " | 1.1 | " | 299 | white | 3 |
| 9-8 | NiCl$_2$ | 0.70 | — | 6.0 | light green | 5.8 | light green | 0 | no change | 0 |
| 9-9 | " | " | HCl | 1.0 | " | 0.9 | " | 289 | light green | 12 |
| 9-10 | PdCl$_2$ | 0.96 | HCl | 0.99 | brown | 0.76 | deep liver brown | 5 | liver brown | 1 |

TABLE 13

| Run No. | Metal Salt Kind | Concn. (wt %) | Acid Added | pH | Tone of Aqueous Solution | pH | Tone of Aqueous Solution | Wt. Gain of Sheet (wt %) | Change of Tone of Sheet | Sorption Rate (wt %) |
| --- | --- | --- | --- | --- | --- | --- | --- | --- | --- | --- |
| 10-1 | $CuCl_2$ | 0.73 | — | 4.2 | light blue | 3.9 | light blue | 198 | bluish green | 15 |
| 10-2 | " | " | HCl | 1.0 | " | 0.8 | " | 332 | light green | 6 |
| 10-3 | $CuSO_4$ | 0.86 | — | 4.6 | " | 4.2 | " | 157 | bluish green | 14 |
| 10-4 | " | " | $H_2SO_4$ | 1.0 | " | 1.1 | " | 254 | light green | 5 |
| 10-5 | $AgNO_3$ | 0.92 | — | 8.2 | colorless transparent | 8.5 | very light yellow | 5 | brown | 1 |
| 10-6 | $ZnCl_2$ | 0.74 | — | 6.4 | " | 6.1 | colorless transparent | 0 | no change | 0 |
| 10-7 | " | " | HCl | 1.0 | " | 0.9 | " | 324 | white | 10 |

TABLE 14

| Run No. | Metal Salt Kind | Concn. (wt %) | Acid Added | pH | Tone of Aqueous Solution | pH | Tone of Aqueous Solution | Wt. Gain of Sheet (wt %) | Change of Tone of Sheet | Sorption Rate (wt %) |
| --- | --- | --- | --- | --- | --- | --- | --- | --- | --- | --- |
| 11-1 | $H_2[PtCl_6]$ | 2.2 | — | 0.89 | orange | 0.77 | orange | 5 | yellow | 1 |
| 11-2 | $K_2Cr_2O_7$ | 1.6 | — | 4.4 | " | 4.7 | " | 5 | yellowish brown | 1 |
| 11-3 | " | " | $H_2SO_4$ | 1.0 | " | 1.1 | " | 34 | brown | 3 |

As described above, the copolymer comprising ethylene and an aminoalkyl acrylate comonomer according to the present invention can be processed to a metallic ion sorber of any arbitrary shape by which various kinds of metallic ions in aqueous solutions can be separated, recovered, or removed in varied embodiments.

While the invention has been described in detail and with reference to specific embodiments thereof, it will be apparent to one skilled in the art that various changes and modifications can be made therein without departing from the spirit and scope thereof.

What is claimed is:

1. A method of sorbing ions of a metal excluding iron and cobalt, which using a metallic ion sorber comprising an ethylene copolymer containing from 40 to 95% by weight of ethylene and from 5 to 60% by weight of at least one of aminoalkyl acrylate compounds represented by formula:

$$CH_2=C(R_1)-C(=O)-O-C_nH_{2n}-N(R_2)(R_3)$$

wherein $R_1$ represents a hydrogen atom or a methyl group, $R_2$ and $R_3$ each represents an alkyl group having from 1 to 4 carbon atoms; and n represents an integer of form 1 to 4, and having a number average molecular weight of from 5,000 to 50,000.

2. A method as claimed in claim 1, wherein said aminoalkyl acrylate compound is at least one of dimethylaminoethyl acrylate, dimethylaminoethyl methacrylate, dimethylamino-n-butyl acrylate, dimethylamino-n-butyl methacrylate, di-n-butylaminoethyl acrylate, di-n-butylaminoethyl methacrylate, methylaminoethyl acrylate, methylaminoethyl methacrylate, aminoethyl acrylate, and aminoethyl methacrylate.

3. A method as claimed in claim 1, wherein said metal belongs to the group IIIA, IVA, VA, VIA, VIIA, VIII, IB, IIB, IIIB, or IBV.

4. A method as claimed in claim 3, wherein said metal is palladium.

* * * * *